United States Patent Office 3,681,016
Patented Aug. 1, 1972

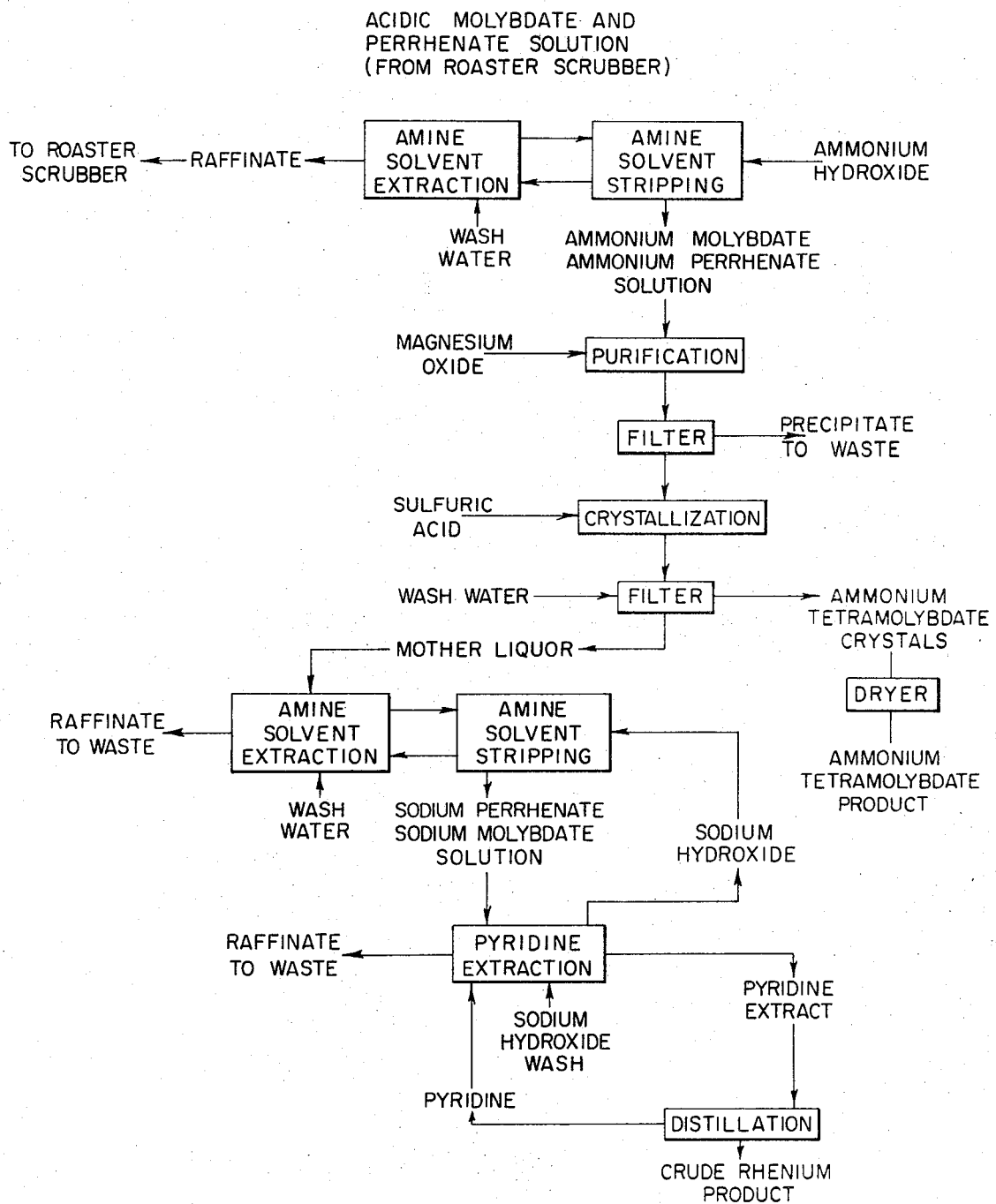

3,681,016
RECOVERY OF RHENIUM AND MOLYBDENUM VALUES FROM SOLUTION
John E. Litz, Lakewood, Colo., assignor to Continental Ore Corporation, New York, N.Y.
Filed Dec. 2, 1970, Ser. No. 94,268
Int. Cl. C22b 59/00
U.S. Cl. 23—15 W 4 Claims

ABSTRACT OF THE DISCLOSURE

A process for recovering rhenium and molybdenum values from solution comprising: extracting the soluble molybdenum and rhenium values with an amine solvent, stripping the values from the amine extract with an ammonium hydroxide solution, purifying the strip solution of copper, iron, silicon, phosphorous, and arsenic, crystallizing the molybdenum as ammonium tetramolybdate containing a minimum of rhenium and other impurities, and concentrating and recovering the rhenium from the crystallization mother liquor by amine solvent extraction, stripping with sodium hydroxide solution, extraction into a pyridine solvent, and distillation of the pyridine away from a rhenium salt.

BACKGROUND OF THE INVENTION

Because rhenium is a scarce metal and is becoming increasingly important, emphasis is being placed on refinements of processes for its recovery from ores, concentrates, flue gases, dusts, etc. It is well known to recover rhenium by roasting molybdinite concentrates and dissolving volatilized rhenium oxide gas in the scrubber solutions from which final recovery is made. The rhenium bearing solutions contain a high percentage of molybdenum as well as impurities of copper, iron, and other metals.

It is particularly important to obtain high recoveries of molybdenum and rhenium values of commercial grade from the scrubber solutions in which they are present together. Prior art processses do not provide the most economic way to recover these metals to meet commercial grade standards from solutions in which they exist together.

In accordance with prior art practices, the rhenium is recovered from the scrubber solution by precipitating it as the rhenium heptasulfide using hydrogen sufide gas, or extracting the rhenium onto an ion exchange resin or a quartenary ammonium organic solvent. Either of the extraction methods requires elution with perchloric acid or destruction of the exchange media for recovery of the rhenium. The use of perchloric acid presents an obvious safety hazard, and the destruction of the exchange media is economically disadvantageous.

Accordingly, it is a principal object of this invention to provide a process for recovering commercial grade molybdenum and rhenium values from scrubber solutions resulting from the roasting of ores containing these metals.

SUMMARY OF THE INVENTION

Molybdenum and rhenium values are extracted with an amine solvent from the scrubber solution resulting from the roasting of molybdenite ore, leaving most of the metal impurities behind. "Solvent" and "ion exchange agent" are used interchangeably herein. The solvent extract is then stripped with ammonium hydroxide to provide a strip solution containing substantially all of the molybdenum and rhenium values as ammonium molybdate and ammonium perrhenate.

The molybdenum values are recovered by crystallization and/or precipitation as ammonium tetramolybdate by adjusting the pH of the strip solution to 2.0–3.5. The product is of acceptable commercial grade.

The rhenium as ammonium perrhenate in the mother liquor is further concentrated by a second extraction with amine. Rhenium and the remaining molybdenum are stripped from the resin with 6 N sodium hydroxide solution, the rhenium extracted with pyridine solvent and finally recovered by distillation of the pyridine away from the rhenium salt.

DESCRIPTION OF THE INVENTION

The process of the invention is illustrated in the accompanying flow diagram.

The molybdenum and rhenium contained in the combined leach and scrubber solutions resulting from the roasting of molybdenite are extracted with a conventional anionic exchange material, such as a tertiary amine resin. The amine group of liquid exchangers all have very good extraction coefficients for molybdenum and rhenium. The tertiary, long chain amines exhibit the lowest solubilities in aqueous solutions and, therefore, are to be preferred. The amines act as a free ammonia molecule and quickly equilibrate with the sulfurous acid in the feed solutions to form the amine bisulfite. The molybdate and perrhenate anions in the feed solution then exchange with the bsisulfite on the amine. The resulting solvent extract contains bisulfites, molybdates, and perrhenates.

Other liquid ion exchange agents may be used, such as tertiary amines in which the groups attached to a nitrogen contain from 6 to 10 carbon atoms, although any tertiary amine of sufficiently high molecular weight to be insoluble in water can be employed. Illustrative of the amines which can be employed are trihexylamine, triheptylamine, trioctylamie, triisoctylamine, trinonylamine, tridecylamine, triisodecylamine, tridodecylamine, trioctadecylamine, tricaprylamine, N,N-dioctylaniline, and the like. A synthetic alkyl amine type resin known commercially as Amberlite IRA–400 may be used. Typical resins for this purpose are disclosed in U.S. Pats. 3,455,677; 3,458,277; 3,495,934 and 3,876,065. Quaternary ammonium compounds may also be used as the ion exchange agent.

Since the copper and any soluble iron ions do not extract, it is desirable to wash out any entrained scrubber solution from the solvent extract. This is accomplished by merely water washing the extract. The wash water from this step is added directly to the feed solution to the extraction to effect the recovery of any contained molybdenum and rhenium values.

The solvent extract is stripped of its values by merely contacting the extract with a basic solution. The amine is converted to the free base form and the basic sulfite, molybdate, and perrhenate salts report to the aqueous phase. It is necessary to recover the molybdenum as a high purity ammonium compound for the subsequent separation of molybdenum and rhenium; therefore, an ammonium hydroxide solution is used for stripping. The volume and strength of the ammonium hydroxide solution can be regulated to give any desired molybdenum concentration in the strip product solution.

A 6-stage continuous mixer-settler apparatus was used in the ion exchange step. The apparatus consisted of three extraction stages—a water wash stage and two stripping stages. Each stage consisted of a 600 cc. mixer and a 175 sq. cm. settler. The solvent used was a 10 volume percent solution of Adogen 383 in kerosene with 5 volume percent isodecanol added to improve phase separation. Adogen 383 is long chain tertiary amine sold by the Ashland Chemical Company of Columbus, Ohio.

For most of the runs the feed solution was fed to the apparatus at 400 cc. per minute. The solvent, wash water, and strip flows were adjusted to give approximately a 14 g./l. Mo loading on the solvent extract, a 2:1 solvent: water wash ratio, and 50 g./l. molybdenum in the strip product solution. The data collected during various tests is shown in Table 1.

TABLE 1

Data from Continuous 3-stage Extraction of Molybdenum and Rhenium from Solution by Tertiary Amine Solvent

[Solvent: 10% Adogen 383; 5% Isodecanol; Kerosene]

| No. | Feed, g./l. | | Solvent loading, g./l. | | Third stage raffinate, g./l. | | Recovery, percent | |
|---|---|---|---|---|---|---|---|---|
| | Re | Mo | Re | Mo | Re | Mo | Re | Mo |
| 1 | 0.0125 | 0.14 | 0.12 | 1.4 | 0.00022 | 0.006 | 98.2 | 95.7 |
| 2 | 0.030 | 1.02 | 0.34 | 11.6 | 0.00025 | <0.004 | 99.2 | 99.6 |
| 3 | 0.030 | 1.02 | 0.34 | 11.6 | 0.00018 | <0.004 | 99.4 | 99.6 |
| 4 | 0.066 | 4.34 | 0.38 | 25.3 | 0.00018 | <0.004 | 99.7 | 99.9 |
| 5 | 0.376 | 5.54 | 1.75 | 15.9 | 0.00025 | <0.004 | 99.9 | 99.9 |

The amine solvent is not very selective and, therefore, will extract practically any large anion present in the scrubber solution in preference to the bisulfite. Phosphorus arsenic, and silicon are commonly present in molybdenites and a portion of these reports to the scrubber or leach solutions. The anionic forms of these elements extract readily and were noted in the strip solutions produced during testing in addition to trace quantities of iron and copper which were not removed when the extract was washed. Removal of the silicon is rather easy as silicic acid hydrolyzes from warm solutions 3 normal or stronger in ammonium ion. The arsenic and phosphorus may be removed by the classical analytical chemistry technique of forming magnesium ammonium arsenate or phosphate precipitates. The iron will hydrolyze during the stripping step, and the copper may be precipitated as a xanthate or sulfide, if necessary.

Any of a number of molybdenum compounds may be recovered from the purified solution containing ammonium molybdate and ammonium perrhenate. At neutral pH's, evaporative crystallization below 50° C. will produce ammonium paramolybdate—$7(NH_4)_2O.12MoO_3$, and evaporative crystallization above 60° C. will produce ammonium dimolybdate—$(NH_4)_2O.2MoO_3$. In U.S. Pat. 3,458,277, it is proposed that ammonium paramolybdate be recovered from a similar ammonium molybdate solution. The example cited for continuous crystallization treats a feed solution containing 64.5 g./l. molybdenum and 0.86 g./l. rhenium (75 parts molybdenum per part rhenium) to recover 24.2% of the molybdenum and 2.1% of the rhenium in a product containing 860 parts molybdenum per part rhenium. This example does not demonstrate an efficient recovery of molybdenum. Another example utilizing batch tests showed that a significant separation of molybdenum from the rhenium as ammonium paramolybdate was made only while the first 10% of the molybdenum was crystallized.

It has been found in accordance with this invention that the crystallization of ammonium tetramolybdate— $(NH_4)_2 \cdot 4MoO_3$—provides an excellent means for recovering the molybdenum as a salt while effecting almost perfect separation from the rhenium. Tests demonstrated that crystallization with ammonium tetramolybdate permitted almost complete recovery of the molybdenum while maintaining excellent separation from the rhenium. A method of forming ammonium tetramolybdate from a similar type medium but not in the presence of rhenium or other metals is disclosed in U.S. Pat. No. 3,455,677. The tetramolybdate is formed by heating the purified product solution to 80° C. to convert all of the ions to dimolybdate. Then the solution is acidified at a moderate rate, 10 to 30 minutes, to 2.0 to 3.5 pH, preferably 2.5 to 3 pH. As the solution is acidified, the molybdenum will polymerize to trimolybdate at about 5.0 pH and to the tetramolybdate ion at about 3.5 pH. The final tetramolybdate solution at pH 2.5 to 3.5 is then seeded to provide a limited number of nuclei for crystal growth. The seeded solution is stirred gently at 80° C. until a sufficient portion of the molybdenum has crystallized. The results of a number of ammonium tetramolybdate crystallizations are shown in Table 2.

The recovery column of Table 2 shows that up to 99% of the molybdenum was recovered and that almost 100% of the rhenium consistently remains in the filtrate. The amonium tetramolybdate recovered was commercial grade.

Table 2 shows that the rhenium content of the solutions at this point is reasonably low, <3 g./l. The solution is acidic and the rhenium can be readily concentrated by a second extraction with an amine solvent. Table 3 shows the effect of pH on the extraction of molybdenum and rhenium from the ammonium tetramolybdate filtrate.

TABLE 2

Data from Crystallization of Ammonium Tetramolybdate from Purified Solvent Extraction Strip Liquor

| No. | Feed, g./l. | | | ATM crystals | | | Filtrate, g./l. | | Recovery | |
|---|---|---|---|---|---|---|---|---|---|---|
| | Mo | Re | Mo/Re, percent | Mo, percent | Re, percent | Mo/Re | Mo | Re | Percent Mo in ATM | Percent Re in filtrate |
| 1 | 20.3 | 1.91 | 10.6 | 59.3 | 0.0032 | 20,000 | 1.1 | 1.56 | 94 | 99.95 |
| 2 | 22.7 | 2.07 | 11.0 | 60.7 | 0.0052 | 11,400 | 4.0 | 1.96 | 82 | 99.92 |
| 3 | 19.7 | 1.94 | 10.2 | 60.8 | 0.0012 | 50,000 | 2.5 | 1.81 | 86 | 99.94 |
| 4 | 49.9 | 1.07 | 46.7 | 59.5 | 0.018 | 3,300 | 4.7 | 1.23 | 92 | 98.6 |
| 5 | 49.9 | 1.07 | 46.7 | 60.5 | 0.004 | 15,000 | 3.9 | 1.09 | 93 | 99.3 |
| 6 | ¹41.8 | 4.25 | 9.9 | 60.6 | 0.0062 | 9,700 | 0.3 | 2.98 | 99 | 99.90 |
| 7 | 31.0 | 1.38 | 22.5 | 60.0 | 0.0010 | 60,000 | 3.5 | 1.77 | 93 | 99.97 |

¹ Synthetic solution.

TABLE 3

Effect of pH on Extraction of Molybdenum and Rhenium from Ammonium Tetramolybdate Filtrate by Tertiary Amine Resin

[Solvent: 10% Adogen 383; 15% Isodecanol; Kerosene]

| pH | Molybdenum | | | | | Rhenium | | | | |
|---|---|---|---|---|---|---|---|---|---|---|
| | Grams per liter | | | Percent extracted | E, a/o | Grams per liter | | | Percent extracted | E, a/o |
| | Feed | Loaded solvent | Raffinate | | | Feed | Loaded solvent | Raffinate | | |
| 5 | 4.3 | 4.0 | 3.3 | 23 | 1.2 | 1.15 | | | | |
| 3 | 3.48 | 10.2 | 0.075 | 97.8 | 136 | 1.77 | 4.9 | 0.139 | 92.0 | 35 |
| 2 | 3.48 | 10.3 | 0.045 | 98.7 | 227 | 1.77 | 5.1 | 0.171 | 96.0 | 72 |
| 1.5 | 3.48 | 10.2 | 0.062 | 98.2 | 165 | 1.77 | 5.2 | 0.044 | 97.5 | 117 |
| 1.0 | 3.48 | 10.0 | 0.137 | 97.1 | 73 | 1.77 | 5.2 | 0.033 | 98.1 | 160 |

The loaded resin extract provides an ideal starting solution for making separation of the rhenium from the remaining molybdenum. In the process of U.S. Pat. 2,876,065, molybdenum and rhenium are exchanged onto an anion exchange material, followed by elution of the molybdenum wth 5 normal sodium hydroxde solution. This process was improved by taking advantage of the second solvent extraction step to prepare a sodium hydroxide strip solution containing the molybdenum and rhenium at relatively high concentrations. Table 4 shows some data from stripping the amine extract with 6 normal sodium hydroxide solution.

TABLE 4

Stripping of Molybdenum and Rhenium from Tertiary Amine Extract by 6 Normal Sodium Hydroxide in grams per liter

[Solvent: 10% Adogen 383; 15% Isodecanol; 75% Kerosene; 6.2 g./l. Re; 21.6 g./l. Mo]

| Rhenium | | Molybdenum | |
|---|---|---|---|
| Solvent | Aqueous | Solvent | Aqueous |
| 1.1 | 51 | 5.9 | 157 |
| 0.6 | 28 | 5.4 | 81 |
| 0.5 | 14 | 3.6 | 45 |
| 0 | 8 | 0 | 27 |

The practice for treating a similar strip solution by the prior art is to pass this solution through an ion exchange bed (U.S. Pat. 2,945,743). The molybdenum is eluted from the ion exchange resin by 5 normal sodium hydroxide. The rhenium is then eluted by a perchloric acid solution. The results reported in this patent indicate that it is possible to produce a product solution containing 203 parts rhenium to 1 part molybdenum.

This procedure was improved on by utilizing pyridine or a pyridine derivative as the rhenium extractant. The efficiency of the rhenium extraction is excellent and the small amount of molybdenum which is entrained in the pyridine extract can be removed by washing with a small portion of 6 normal sodium hydroxide. This wash is used for make-up of the second amine extraction strip solution. Data illustrating the rhenium extraction-molybdenum rejection by pyridine are presented in Table 5.

The table shows that over 99% of the rhenium is extracted with practically no molybdenum extracted.

The rhenium was recovered from the pyridine extract by distillation. There are two excellent means of recovering the rhenium and pyridine separately from the extract. In the first, the extract is boiled until about 90% of the volume has been distilled away. Then portions of water are added to the bottoms as the distillation proceeds. In this manner, all of the pyridine may be removed by distillation without the formation of a dry, rhenium-bearing residue. In the second method, a portion of potassium chloride is added to the extract prior to distillation of the pyridine. This permits the rhenium to collect as the distillation residue in a form desirable for reduction to metal.

produced by these two methods and, in particular, demonstrates the excellent separation from molybdenum. The products contained 59,000 and 33,000 parts rhenium per 1 part molybdenum.

TABLE 6

Analyses of Rhenium Products

| | Air dried rhenium heptasulfide percent | Crude rhenium metal percent |
|---|---|---|
| Rhenium | 59.0 | 33 |
| Aluminum | 0.005 | Major |
| Boron | (¹) | <0.05 |
| Copper | 0.0225 | <0.05 |
| Iron | 0.002 | <5. |
| Lead | 0.01 | <0.01 |
| Magnesium | 0.002 | <0.05 |
| Molybdenum | <0.001 | <0.01 |
| Potassium | (¹) | <0.05 |
| Silicon | 0.10 | <5. |
| Sodium | (¹) | <0.05 |
| Tin | 0.05 | (¹) |
| Others | <0.01 | <0.01 |

¹ Not dried.

Tables 1 and 2 show that up to 98% of the molybdenum contained in the original feed samples was recovered by the process. Tables 1, 2, 5 and 6 show that up to 99% of rhenium contained in the original samples was recovered by the process. The final products obtained were substantially free of impurities derived from the feed solution.

The invention described provides an effective and economical method for almost 100% recovery of molybdenum and rhenium from solutions in which they are present together. Although the solutions from which the recoveries are ordinarily made are ordinarily scrubber solutions resulting from roasting of molybdenite concentrates, the invention is not restricted to recovery of the metals from this type solution.

What is claimed is:

1. A process for recovering molybdenum and rhenium values from solutions in which they are present together with other metal ion impurities which comprises:
   (a) extracting the rhenium and molybdenum values from the solution with a liquid water insoluble amine ion exchange agent;
   (b) stripping the rhenium and molybdenum values from the loaded agent of (a) with a basic solution of an ammonium compound;
   (c) crystallizing molybdenum as ammonium tetramolybdate from the strip solution of (b) by adjusting the pH of the strip solution to about 2.0–3.5;

TABLE 5

Data for Extraction of Rhenium and Rejection of Molybdenum by Pyridine from 6 M Sodium Hydroxide Solution

| Test No. | Molybdenum | | | | | Rhenium | | | | |
|---|---|---|---|---|---|---|---|---|---|---|
| | Grams per liter | | | Percent extracted | E, a/o | Grams per liter | | | Percent extracted | E, a/o |
| | Feed | Loaded solvent | Raffinate | | | Feed | Loaded solvent | Raffinate | | |
| 1 | 14.5 | 0.35 | 11.4 | 5 | 0.03 | 3.05 | 1.7 | 0.010 | 99.6 | 170 |
| 2 | 17.1 | 0 | 18.4 | 0 | 0 | 1.42 | 1.2 | 0.008 | 99.5 | 155 |
| 3 | 14.5 | 0.09 | 9.9 | 5 | 0.009 | 3.05 | 0.40 | 0.003 | 99.8 | 133 |
| 4 | 14.5 | 0.94 | 10.8 | 20 | 0.09 | 3.05 | 3.3 | 0.03 | 99.0 | 110 |
| 5 | 14.5 | 0.07 | 10.5 | 3 | 0.007 | 3.05 | 0.84 | 0.01 | 99.5 | 84 |
| 6 | 18.4 | | | | | 1.5 | 1.48 | 0.018 | 99.1 | 82 |
| 7 | 40.9 | 0 | 41.1 | 0 | 0 | 16.8 | 8.7 | 0.107 | 99.3 | 81 |
| 8 | 18.4 | | | | | 1.5 | 1.48 | 0.025 | 98.7 | 59 |
| 9 | 40.9 | 0 | 45.0 | 0 | 0 | 16.8 | 17.6 | 0.326 | 98.0 | 54 |
| 10 | 40.9 | 0 | 46.1 | 0 | 0 | 16.8 | 44.7 | 5.26 | 69 | 8.5 |

Portions of rhenium have been recovered from the extract by both of these procedures. In the first, the rhenium was precipitated from the distillation bottoms as the rhenium heptasulfide. In the second, the rhenium was reduced to metal with hydrogen. The potassium and sodium salts were removed by leaching with water and dilute hydrochloric acid. Table 6 shows the quality of the rhenium (d) recovering the crystallized ammonium tetramolybdate of (c) followed by recovery of molybdenum values therefrom;
   (e) extracting rhenium values from the mother liquor of (d) with a liquid water insoluble amine ion exchange agent;

(f) stripping the loaded agent of (e) with an alkali metal hydroxide;

(g) extracting rhenium values from the strip solution of (f) with pyridine or pyridine derivative; and (h) recovering rhenium from the pyridine extractant by distilling off the pyridine.

2. The process of claim 1 in which metal ion impurities are removed from the strip solution of (b) before crystallizing ammonium tetramolybdate in (c).

3. The process of claim 1 in which the anion exchange agent in (a) is a tertiary amine ion exchange resin and the stripping solution of (b) is ammonium hydroxide.

4. A process for recovering molybdenum and rhenium values from pregnant acid leach solutions containing these values together with other metal impurities and derived from dusts and flue gases resulting from roasting relatively impure molybdenite concentrate, said process comprising:

(a) extracting molybdenum and rhenium values from the pregnant acid solution with a liquid water insoluble amine ion exchange agent;

(b) stripping the molybdenum and rhenium values from the exchange resin with ammonium hydroxide solution to form a strip solution containing the molybdenum as ammonium molybdate and the rhenium as ammonium perrhenate;

(c) crystallizing the molybendum from the strip solution in (b) as ammonium tetramolybdate by adjusting the pH of the solution to a pH between about 2.5–3.5;

(d) separating the crystallized ammonium tetramolybdate from the mother liquor of (c);

(e) extracting rhenium values from the mother liquor of (d) with a liquid water insoluble amine ion exchange agent;

(f) stripping rhenium values from the loaded agent of (e) with sodium hydroxide;

(g) recovering rhenium values from the strip solution of (f) by extracting with pyridine; and (h) recovering rhenium from the pyridine extractant by distilling off the pyridine.

References Cited

UNITED STATES PATENTS

| | | | |
|---|---|---|---|
| 3,455,677 | 7/1969 | Litz | 23—15 W |
| 3,458,277 | 7/1969 | Platzke et al. | 23—15 W |
| 2,876,065 | 3/1959 | Zimmerley et al. | 23—18 X |
| 2,945,743 | 7/1960 | Zimmerley et al. | 23—24 |
| 3,244,475 | 4/1966 | Churchward | 23—15 W |
| 3,495,934 | 2/1970 | Ziegenbaly et al. | 23—23 X |
| 3,558,268 | 1/1971 | Proter et al. | 23—22 |

HERBERT T. CARTER, Primary Examiner

U.S. Cl. X.R.

23—23, 24 R, 51 R